US007021504B2

(12) United States Patent
Dittmann et al.

(10) Patent No.: US 7,021,504 B2
(45) Date of Patent: Apr. 4, 2006

(54) APPARATUS FOR DISPENSING FREE-FLOWING MATERIAL

(75) Inventors: Ralf Dittmann, Melbek (DE); Alfred Luger, Voegelsen (DE); Muenuer Menekse, Buechen (DE)

(73) Assignee: Nordson Corporation, Westlake, OH (US)

( * ) Notice: Subject to any disclaimer, the term of this patent is extended or adjusted under 35 U.S.C. 154(b) by 358 days.

(21) Appl. No.: 10/667,725

(22) Filed: Sep. 22, 2003

(65) Prior Publication Data

US 2005/0098579 A1 May 12, 2005

(30) Foreign Application Priority Data

Sep. 23, 2002 (DE) .......................... 202 14 715 U

(51) Int. Cl.
*G01F 11/06* (2006.01)

(52) U.S. Cl. ....................... 222/333; 222/368; 222/410

(58) Field of Classification Search ................ 222/333, 222/367, 368, 410, 411, 414
See application file for complete search history.

(56) References Cited

U.S. PATENT DOCUMENTS

| | | | | | |
|---|---|---|---|---|---|
| RE22,437 | E | * | 2/1944 | Sinden | 222/240 |
| 2,699,279 | A | * | 1/1955 | Dodge et al. | 222/636 |
| 3,319,840 | A | * | 5/1967 | Wolf et al. | 222/333 |
| 4,946,078 | A | * | 8/1990 | Heep et al. | 222/368 |
| 5,002,084 | A | * | 3/1991 | Wilson | 137/15.24 |
| 6,138,591 | A | * | 10/2000 | Horsch | 111/178 |
| 6,293,439 | B1 | * | 9/2001 | Schleicher et al. | 222/368 |

* cited by examiner

*Primary Examiner*—Joseph A. Kaufman
(74) *Attorney, Agent, or Firm*—Wood, Herron & Evans, L.L.P.

(57) ABSTRACT

Apparatus for dispensing a free-flowing material comprising a container for receiving the material, a pump connected to the container for conveying the material to a port from which free-flowing material can be dispensed. The pump includes at least one rotatable pump element and a rotatable drive shaft coupled to the pump element, a drive motor, and a coupling attached between the drive shaft and the drive motor. The coupling is radially detachable from the drive shaft.

7 Claims, 2 Drawing Sheets

APPARATUS FOR DISPENSING FREE-FLOWING MATERIAL

FIELD OF THE INVENTION

The present invention relates to a device for dispensing free-flowing material and, in particular for dispensing thermoplastic material.

BACKGROUND OF THE INVENTION

Devices of this kind for dispensing material, in particular thermoplastic material such as hot melt adhesive, are known in various embodiments. For example, in one embodiment the material to be dispensed is first filled into the container in a solid state, and then melted to a free-flowing state. The free-flowing material is then channeled from the container to a pump and from there to a connection point that can be connected to at least one tube for further conveying the molten material.

The container, the pump and the drive motor are mounted onto the frame or rack of the apparatus in such a way that the pump, the coupling and the drive motor are arranged in series underneath the container and housed inside a cabinet attached to the frame.

A number of problems arise as a result of this arrangement. When assembling the pump, the coupling and the drive motor, it is necessary to ensure at all times that the drive shaft of the drive motor and the drive shaft of the pump are precisely aligned with each other, which is a time-consuming affair and often almost impossible due to the manufacturing tolerances of the components and fixing elements. Furthermore, thermally induced effects brought about by the relatively intensive heating of some components cause melting of the material, deformations of the components and thermal distortions that lead to a misalignment of the dive shafts of the drive motor and the pump. In the prior art, this has often exposed the shafts and bearings to considerable mechanical and dynamic stress, for example to high bending moments that have led, in turn, to greater wear, especially of bearings. Due to these factors, it was often necessary to replace the pump, the drive motor, or the coupling between the pump and the motor with new components. Considerable costs were incurred as a consequence.

The object of the present invention is therefore to avoid the disadvantages of the prior art to a considerable extent and to provide an apparatus for dispensing free-flowing material that is simpler to assemble and disassemble, and that leads to less wear.

SUMMARY OF THE INVENTION

Generally, the present invention provides a coupling which is radially detachable from the drive shaft for driving the pump.

An advantage of the invention is that the drive shaft for driving the pump is radially detachable from the coupling and can also be inserted radially into the coupling during assembly. Assembly and disassembly are thus considerably simplified, because it is no longer necessary to disassemble the entire drivetrain comprising the drive motor, the coupling and the pump. Instead, the coupling can be simply detached.

According to another aspect of the invention or a preferred embodiment thereof, it is proposed that the coupling be configured in such a way that an axial offset and/or an angled offset is possible during operation between a shaft of the drive motor and the drive shaft for driving the pump. Assembly and disassembly are further simplified with such a coupling because precise alignment of the shaft of the pump and the drive motor is no longer necessary. Furthermore, the coupling easily compensates for any angular or axially parallel offset of the shafts in relation to each other that may result from thermal expansion. The coupling avoids any lateral forces or bending moments being exerted on the shafts. This reduces wear on the bearings and extends service life.

It is preferred that the coupling has a detachably attached coupling element, such that when the coupling element is detached, the coupling of the drive shaft is radially detachable from the drive shaft, or the drive shaft is radially detachable from the coupling. One particularly simple design is obtained when the coupling has a ring element surrounding the drive shaft for driving the pump. The ring element can include two ring segments that are completely separable from each other. The ring segments can be easily separated from or joined to each other.

Other advantageous embodiments of the invention are described below.

BRIEF DESCRIPTION OF THE INVENTION

The invention will now be described on the basis of an embodiment and with reference to the drawings.

DETAILED DESCRIPTION OF THE PREFERRED EMBODIMENT

Figure 1:
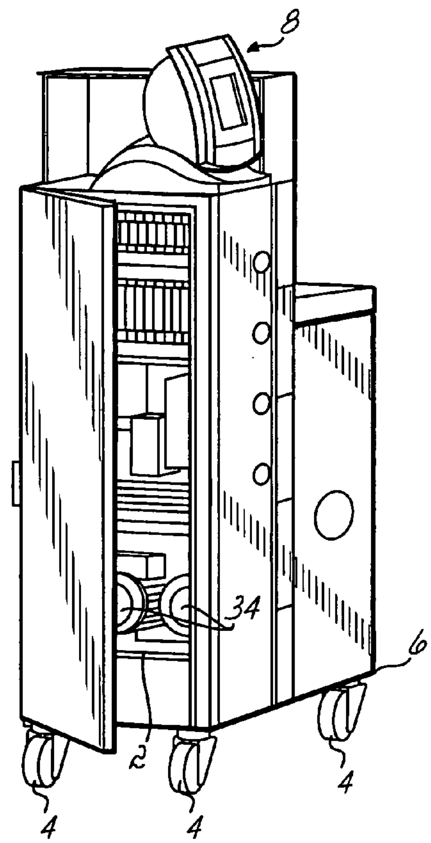
FIG. 1 is a perspective view of an apparatus according to the invention for melting and dispensing free-flowing material.

The preferred embodiment shown in the Figures is an apparatus for dispensing thermoplastic material, in particular hot melt adhesive. The separate components of the apparatus are supported by a frame 2 that can be moved by a total of four rollers 4. Each roller is attached to one corner of a parallelepipedal base 6 of frame 2. Also attached to frame 2 are outer walls and doors, as well as a control and regulation unit 8 with an operating and display panel 8.

Figure 2:
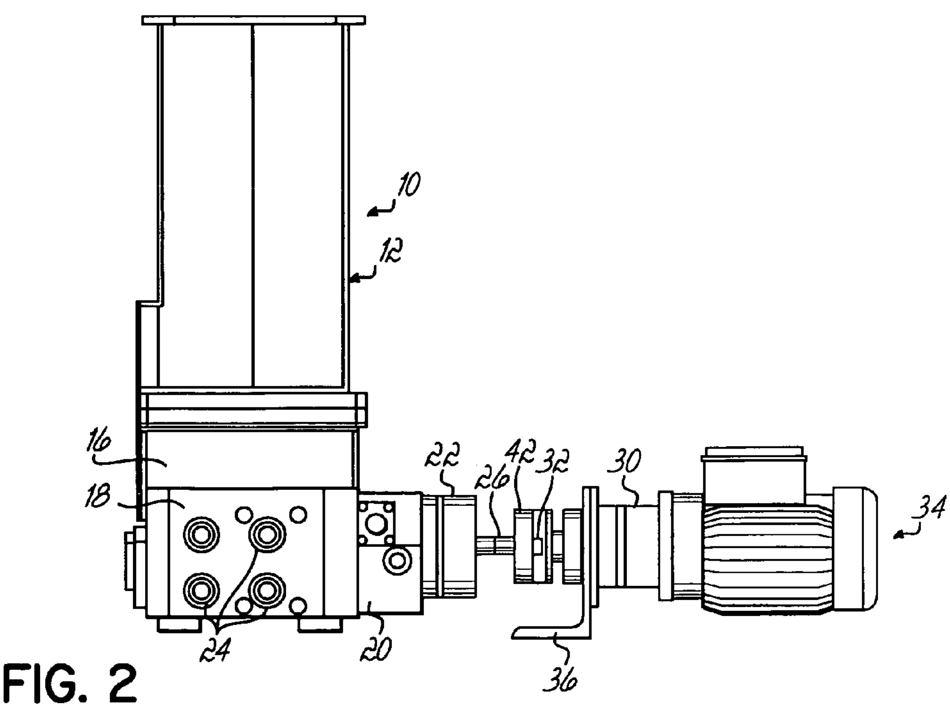
FIG. 2 is a side elevation view of a portion of the apparatus in FIG. 1.
Figure 3:
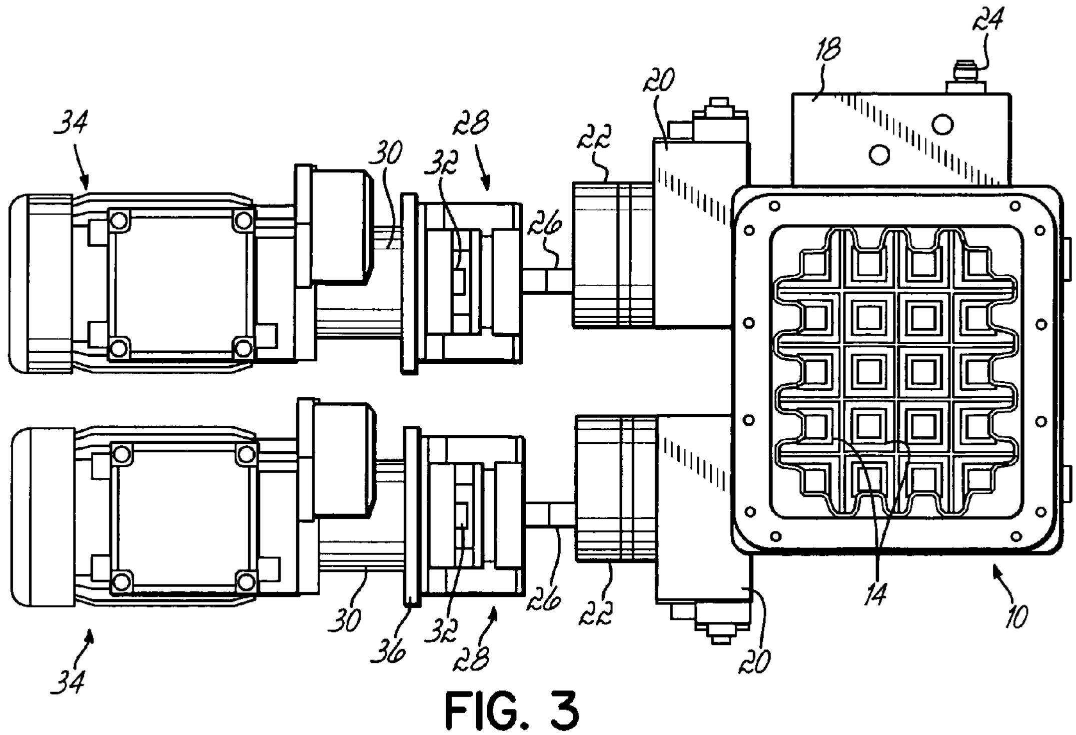
FIG. 3 is a plan view of the portion shown in FIG. 2.

As FIGS. 2 and 3 show, a container 10 for receiving the material is disposed inside a portion of the apparatus—on the right in FIG. 1—and can be filled through an upper inlet opening with the material, which can initially be in a solid state, for example in the form of pellets or the like. An electrically heated grid 14 is disposed in an upper preheating area 12 of container 10 (see FIG. 3). An electrically heatable melter group 16 is also disposed in the lower portion of the container 10. The melter group 16 includes heatable surfaces that can be brought into contact with the material to be melted in order to make the material completely free-flowing and be able to heat it up to a particular temperature. A tube manifold block 18 is disposed underneath the melter group 16, and a plurality of channels for further conveying the free-flowing material is disposed inside the tube manifold block 18. Two safety valve blocks 20 are screwed onto the tube manifold block 18. Two pumps 22 are fastened to the tube manifold block 18 for conveying the material under pressure through the valve block 20 and the tube manifold block 18 to at least one port or connection 24, to which at least one tube (not shown) can be connected for further conveying the molten material to the point of application. Inside the tube manifold block 18 and valve blocks 20, but not shown in the Figures, there are channels for the free-flowing material so that material is conveyed from the container 10 to the pump 22 and through the valve blocks 20 and the tube in the manifold block 18 to the one connection or port 24 or to a plurality of connections or ports 24 (see also FIG. 2).

Pumps 22 are configured as gear pumps and are each fitted with a drive shaft 26 so that they are able to rotatably drive at least one rotatable pump element, not shown, which in the embodiment comprises two intermeshing gear wheels.

A coupling 28 is joined on the one side to each drive shaft 26 and on the other side to a gearbox 30. The gearbox 30 includes its own drive shaft 32. Each gearbox 30 is flange-mounted to a drive motor 34 configured as an electric motor. Drive motors 34, for their part, are mounted on a portion of frame 2. Gearboxes 30 are supported by an elbow connector 36 that is also attached to a portion of frame 2. The two electric motors 34 can partly be seen in FIG. 1.

Figure 4:
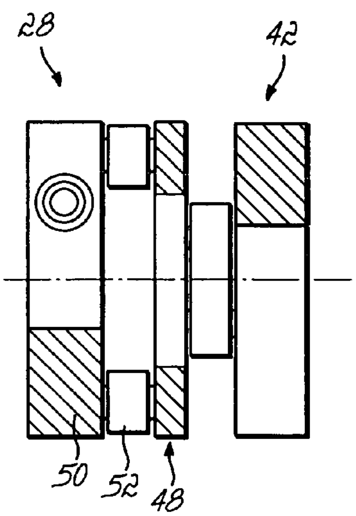
FIG. 4 is a partial section of a coupling in side elevation view.
Figure 5:
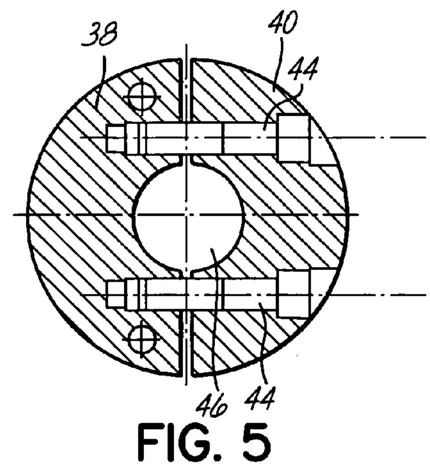
FIG. 5 is a cross-section of the coupling pursuant to FIG. 4.

Coupling 28 of the invention is shown in enlarged form in FIGS. 4 and 5 and comprises several coupling elements. Couplings 28 may, for example, be Semiflex (registered trademark) couplings from the NFB SD series, which are sold and commercially available from Schmidt-Kupplung GmbH, Am Rehmanger 9, D-38304 Wolfenbüttel, Germany. When the couplings 28 are configured as described below, they can be radially detached, in relation to the rotational axis of drive shaft 26, from the drive shafts 26 for driving the pumps 22. This is made possible by the couplings 26 having a two-part ring 42 comprised of two ring [elements] segments 38, 40. The two ring segments 38, 40 are detachably attached to each other by two threaded bolts 44 and can be entirely separated from each other. In the center of ring 42 there is a bore 46 into which the drive shaft 26 of pump 22 projects in the assembled state. When threaded bolts 44 are firmly tightened, a frictional connection is formed between ring 42 of coupling 28 such that a torque can be transferred. By loosening threaded bolts 44, the two ring segments 38, 40 can be completely detached from each other in such a way that the coupling can be radially detached from the respective drive shaft 26. This enables simple assembly and disassembly of pumps 22, without having to entirely disassemble coupling 28 and also drive motor 34 and gearbox 30.

Coupling 28 is also configured in such a way that an axial offset and/or an angled offset is possible during operation, and also during assembly and disassembly, between the drive shaft 32 of gearbox 30, or of a drive motor 34 if there is no gearbox inbetween, and drive shaft 26, such that drive shafts 32 and 26 do not have to be precisely aligned with each other. Axial or angular offsets arising from thermal effects, in particular, can thus be compensated with the help of the coupling. For this purpose, coupling 28 comprises, in addition to ring 42, additional rings 48, 50 that are movable relative to each other and coupled in a substantially torsionally stiff manner by means of pins 52, yet permit angular movements relative to each other as well as axial offset. Coupling pins 52 co-operate with recesses provided in ring 48. For details, reference is made to the Semiflex couplings.

We claim:

1. Apparatus for dispensing a free-flowing material comprising a container for receiving the material, a pump connected to said container for conveying the material to a port from which the free-flowing material can be dispensed, said pump having at least one rotatable pump element and a first drive shaft coupled to said pump element and rotatable about a first axis of rotation, a drive motor, and a coupling attached between said first drive shaft and said drive motor said coupling being detachable from said first drive shaft in a radial direction relative to the first axis of rotation of said first drive shaft.

2. Apparatus according to claim 1, further comprising a second drive shaft associated with said drive motor and attached to said coupling, said second drive shaft rotatable about a second axis of rotation, and said coupling forming an offset between said respective first and second axes of rotation.

3. Apparatus according to claim 1, wherein said coupling has a ring element surrounding said first drive shaft associated with said pump, said ring element comprising two ring segments that are completely separable from each other.

4. Apparatus according to claim 3, wherein said ring segments can be detachably attached to each other.

5. Apparatus according to claim 1, wherein said drive motor further comprises an electric motor with a gearbox coupled thereto.

6. Apparatus according to claim 1, wherein said pump further comprises a gear pump.

7. Apparatus according to claim 1, further comprising a heater coupled with said container for melting the material stored in said container.

* * * * *